United States Patent Office 3,432,741
Patented Mar. 11, 1969

3,432,741
SATURABLE REACTOR/CONSTRAINING
INDUCTOR ARRANGEMENT
John D. Bishop, Basking Ridge, N.J., assignor to Bell
Telephone Laboratories, Incorporated, Murray Hill,
N.J., a corporation of New York
Filed Oct. 11, 1967, Ser. No. 674,532
U.S. Cl. 321—45         5 Claims
Int. Cl. H02m 7/52, 7/72

ABSTRACT OF THE DISCLOSURE

In the control circuit of a saturable reactor the control winding and the constraining inductor are divided into an equal number of winding sections. The individual winding sections of the control winding are wound directly over each other on the saturable reactor cores and the individual winding sections of the constraining inductor are wound directly over each other on a separate constraining inductor core. The individual winding sections are serially connected across the D.C. control source with successive sections from the control winding and the constraining inductor following one another in alternation. The relative polarities of the winding sections are such that the winding sections of the constraining inductor cancel the A.C. voltages induced by the load current in the corresponding control winding sections. As a result, the effects of interwinding capacitances are substantially eliminated, thereby allowing a considerable increase in the load-current-to-control-current ratio without causing excessive distortion in the load current waveform due to winding capacitance effects.

Background of the invention

The invention relates generally to saturable core reactors and, more specifically, to saturable core reactors which utilize constraining inductors in their control circuits.

When a saturable core reactor which is serving as constant current A.C. source is operated in the constrained mode, it has a constraining inductor connected in series with its control windings across its D.C. control current source. Such constraining inductor suppresses alternating control winding currents which would otherwise exist in the control circuit as a consequence of the A.C. voltage induced in the control winding, thereby achieving the low distortion rectangular load current waveform characteristic of the constrained mode of operation. The presence of such load current distortion is particularly undesirable in square-wave applications as, for instance, in the case where the saturable core reactor serves as a constant current source for the square-wave drive signal of a driven inverter which operates at a relatively high operating frequency.

It has generally been necessary to limit the load-current-to-control-current ratio of such saturable core reactor circuits to a maximum ratio of about 2:1 in order to minimize the load current waveform distortion in such applications, where the waveform distortion has been principally due to constraining inductor winding capacitances. As a result, the usefulness of such saturable core reactors has been severely limited.

A primary object of the present invention is to increase the load-current-to-control-current ratio of saturable core reactor circuits.

Another object of the invention is to increase the effectiveness of saturable core reactor circuits.

A further object of the invention is to reduce the distortion in the load current waveform of saturable core reactor circuits operating in the constrained mode.

Summary of the invention

To fulfill these objects of the invention the constraining inductor and the control winding of a saturable core reactor are each divided into several winding sections which are interconnected in such a manner as to reduce the detrimental effects of interwinding capacitances to allow a substantial increase in the load-current-to-control-current ratio without the heretofore accompanying waveform distortion.

More specifically, in one embodiment of the invention the constraining inductor and the control winding are each divided into four separate winding sections. The individual winding sections of the control winding are wound directly over each other on the saturable reactor cores, while the individual winding sections of the constraining inductor are wound directly over each other on a separate constraining inductor core. The winding sections are serially connected across the D.C. control current source with successive sections from the control winding and the constraining inductor following one another in alternation. The relative polarities of the winding sections are such that the winding sections of the constraining inductors cancel the respective A.C. voltages induced by the load current in the corresponding control winding sections. As a result, the effects of interwinding capacitances are substantially eliminated, thereby allowing an increase of the load-current-to-control-current ratio to a ratio as high as 10:1 without causing serious distortion in the load current waveform.

Detailed description

Figure 1:
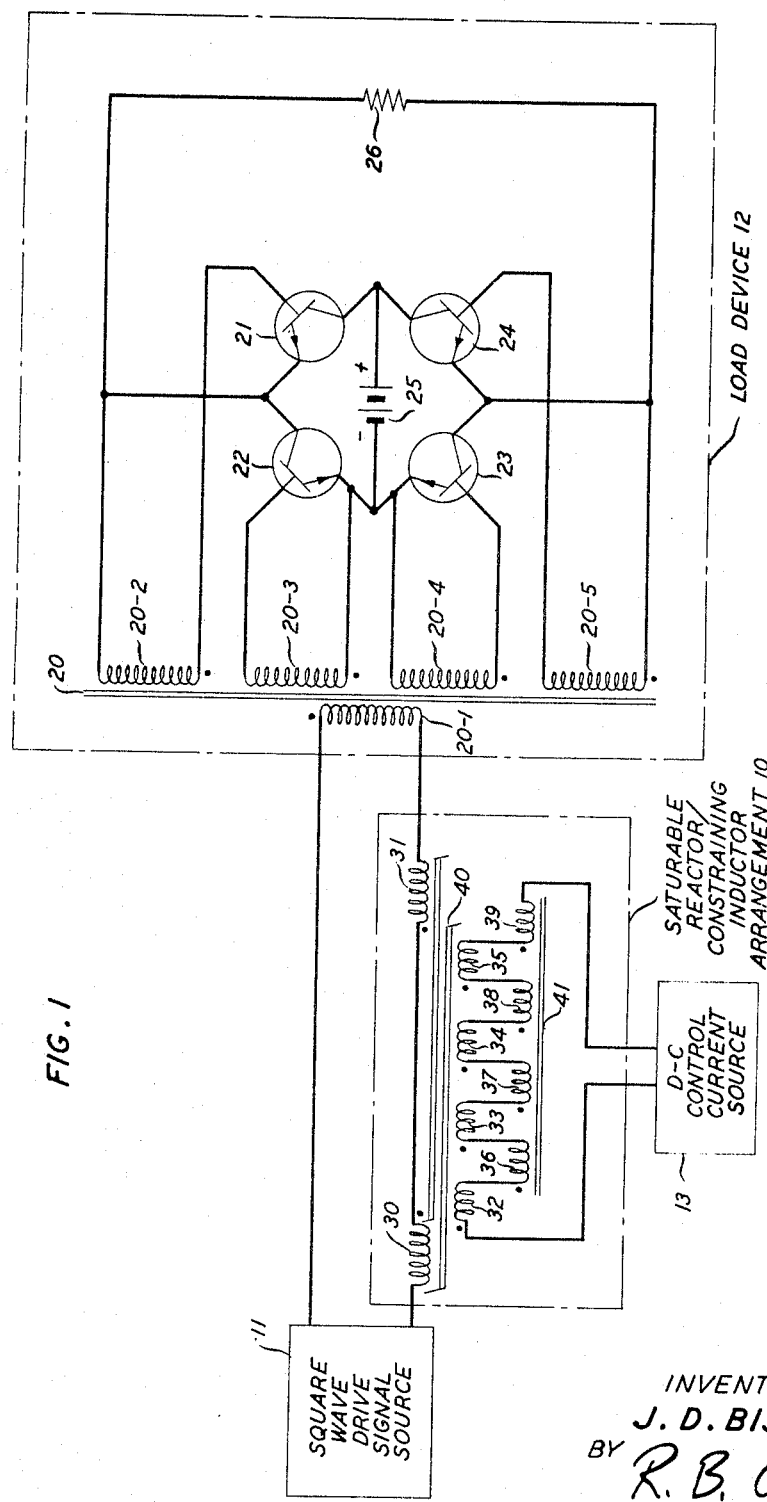
FIG. 1 is a schematic diagram of a driven inverter in which a saturable reactor which embodies the principles of the invention is used as a constant current source.

In the embodiment of the invention illustrated in FIG. 1 of the drawing a saturable reactor/constraining inductor arrangement 10 receives its signal input from square-wave drive signal source 11 to supply a current regulated square-wave output signal to load device 12. The amplitude of the square-wave output current of the saturable reactor/constraining inductor arrangement 10, in turn, is proportional to the control current amplitude derived from D.C. control current source 13.

Load device 12 is a standard bridge type inverter comprising a drive transformer 20, switching transistors 21 through 24, D.C. source 25, and a load impedance 26. The input to the inverter is obtained through primary winding 20–1 of transformer 20. The drive signal is coupled from primary winding 20–1 to the individual emitter-base circuits of transistors 21 to 24 through secondary windings 20–2 to 20–5, respectively, by connecting one terminal of a respective secondary drive winding to the base electrode and the other terminal to the emitter electrode of the corresponding transistor. In order to simplify the bridge circuit, standard type biasing components, such as current limiting resistors, have been omitted from the circuit. The emitter electrodes of transistors 22 and 23 and the collector electrodes of transistors 21 and 24 are, in turn, connected together to form one diagonal of the bridge circuit with D.C. source 25 connected across it. The emitter electrodes of transistors 21 and 24, on the other hand, are individually connected to the collector electrodes of transistors 22 and 23, respectively, to form the output diagonal of the bridge across which load impedance 26 is connected. The dots on the respective windings of transformer 20 indicate the relative polarities of the respective drive signals which are coupled through the transformer and which are used to control the conduction of switching transistors 21 through 24. As a result of the square-wave drive signal which originates from square-wave drive source 11, transistor pairs 21, 23 and 22, 24 are rendered conductive alternately and in phase opposition to one another to invert the direct power supplied from D.C. source 25, thereby supplying a square-wave output current to load impedance 26.

The input to primary winding 20–1 of drive transformer 20 is obtained by serially connecting primary winding 20–1 with load or gate windings 30 and 31 of saturable reactor/constraining inductor arrangement 10 across square-wave drive signal source 11. Saturable reactor/constraining inductor arrangement 10 comprises, in addition to load windings 30 and 31, control winding sections 32 through 35 and constraining inductor winding sections 36 through 39. Load windings 30 and 31 are individually wound on separate sections of saturable reactor cores 40, while the control winding sections 32 to 35 are wound over both sections of saturable reactor cores 40. Constraining inductor winding sections 36 to 39, on the other hand, are wound on a separate constraining inductor core 41. The dots associated with each of the winding sections indicate the relative polarity relationship between the individual winding sections of the control winding and the constraining inductor, respectively. Control winding sections 32 through 35 and constraining inductor winding sections 36 through 39 are serially connected across D.C. control current source 13 in an alternate fashion in the following winding sequence: 32–36–33–37–34–38–35–39, thereby completing the series connection across control current source 13.

In the operation of the circuit illustrated in FIG. 1 a square-wave drive signal of predetermined frequency is applied from square-wave drive signal source 11 through the load winding sections 30 and 31 of saturable reactor/constraining inductor arrangement 10 to the inverter depicted in load device 12. As a result, a square-wave current is derived from D.C. source 25 and is supplied to load impedance 26.

In order to assure optimum operating conditions and a minimal amount of waveform distortion for the arrangement illustrated in FIG. 1, it is necessary that the square-wave drive signal which is applied to load device 12 takes the form of a constant current signal. The saturable reactor/constraining inductor arrangement 10 operates on the signal derived from square-wave drive signal source 11 to produce the desired current characteristics. That is, the load current, or the square-wave drive signal derived from square-wave drive signal source 11 and supplied to load device 12, is conducted through load windings 30 and 31 of the saturable reactor and is subjected to the effects of the D.C. control current conducted through control winding sections 32 through 35.

The saturable reactor functions in a conventional manner as is descrbed, for instance, in Chapter 4 of "Magnetic Amplification, Theory and Applications," by Sidney Platt, published in 1958 by Prentice-Hall. That is, the D.C. control current from source 13 is used to control the square-wave drive signal from source 11 which is supplied to the load impedance 26, as a result of which the saturable reactor exhibits the characteristics of a constant current source.

Because of the mutual coupling between the load windings and the control windings of the saturable reactor, the A.C. gate winding voltage induces an A.C. component of voltage into the control windings. In order to suppress the currents resulting from these A.C. components in the control circuit a constraining inductor which presents a high impedance to these induced A.C. voltages is included in the control circuit. That is, a constraining inductor is connected in series with the control winding to suppress A.C. currents in the control circuit. The control circuit current is therefore prevented from varying, regardless of what happens to the A.C. voltage induced in the windings. In the embodiment of the invention illustrated in FIG. 1 winding sections 36 to 39 comprise the constraining inductor.

One measure of the effectiveness of a particular saturable core reactor circuit may be measured by the allowable ratio of load current to control current. The higher the current ratio, the more effective is the arrangement. The limit of the current ratio is generally determined by the type of load current to be regulated and by the amount of distortion that can be tolerated in the particular application. Such distortion is particularly detrimental in applications of the saturable reactor to driven inverters where the load current takes the form of a square wave and where the repetition rate of the square wave may be especially high.

The primary source of such distortions is the interwinding capacitance of both the control windings and the constraining inductor windings. In conventional saturable reactor/constraining inductor arrangements the effects of the winding capacitance, and therefore the waveform distortion, increases with an increase in load-winding-to-control-winding ratio; that is, the degree of load current waveform distortion is proportional to the load-current-to-control-current ratio. As a result, it has heretofore been necessary to limit this ratio to a maximum of 2:1 to prevent serious load current waveform distortion, thereby severely limiting the application of saturable reactors.

Figure 2:
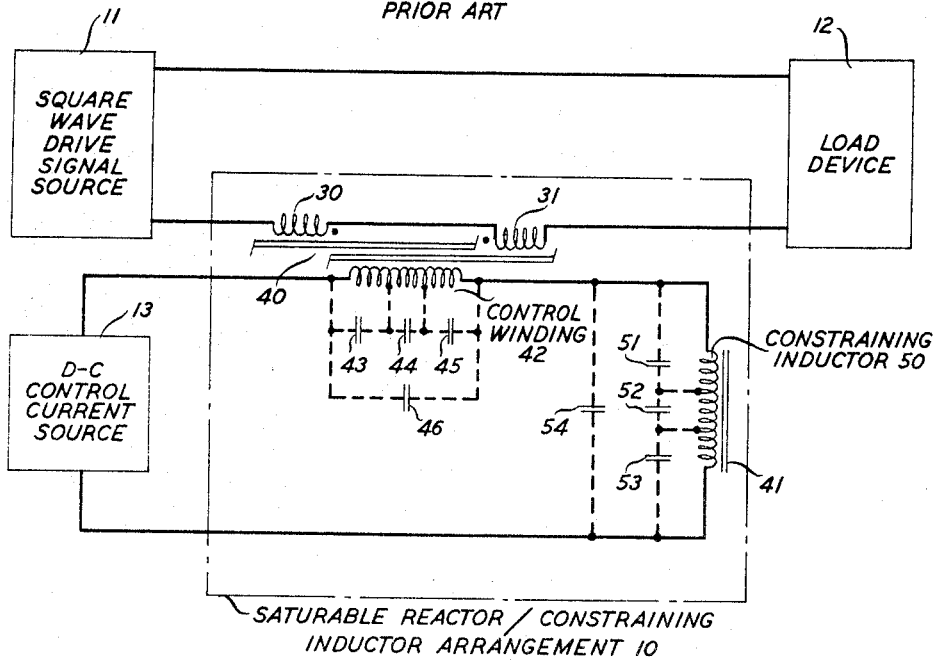
FIG. 2 is a schematic diagram of a prior art saturable core reactor which illustrates the distribution of the winding capacitances of the conventional control winding and constraining inductor arrangement.

FIG. 2 is an illustration of a prior art saturable reactor/constraining inductor arrangement. Identical numerical designations have been used for the circuit components of FIG. 2 which are identical to those used in the arrangement of FIG. 1. In the circuit of FIG. 2 a square-wave drive signal source 11 supplies a square-wave drive signal to a load device 12 through load windings 30 and 31 of saturable reactor/constraining inductor arrangement 10. Saturable reactor magnetization control is obtained from D.C. control current source 13 which applies the control current to the series arrangement of control winding 42 and constraining inductor 50. Control winding 42 is wound on saturable cores 40 as one continuous winding. Constraining inductor 50, on the other hand, has a continuous winding on its own individual constraining inductor core 41. Because of this winding arrangement, control winding 42 as well as constraining inductor 50 each exhibit inherently high effective winding capacitances which are represented by capacitors 43 to 46 and 51 to 54, respectively. As a result of these winding capacitances, the square-wave voltages which are induced in the control circuit generate spurious currents which generally produce ringing in the control circuit. This ringing, in turn, modulates the D.C. control current, thereby distorting the D.C. control current. Since the amplitude of the control current directly controls the magnitude of the A.C. load current, it is evident that any distortion in the control current, in turn, produces distortions in the A.C. load current. Since the magnitude of the A.C. signal which is induced in the control winding and, consequently, the resulting ringing current is directly proportional to the control-current-to-load-current ratio, it has heretofore been necessary to limit the control-current-to-load current ratio to the order of 2:1 to prevent serious load current waveform distortion.

The embodiment of the present invention illustrated in FIG. 1, on the other hand, allows an increase in the load-current-to-control-current ratio of saturable core reactors to a ratio of 10:1, yet at the same time producing current controlled output waveforms which are vastly superior to those of conventional saturable reactor/constraining inductor arrangements. The increase in current ratio together with the decrease in waveform distortion is made possible by a special winding arrangement of the control winding and the constraining inductor as illustrated in FIGS. 1 and 3.

Figure 3:
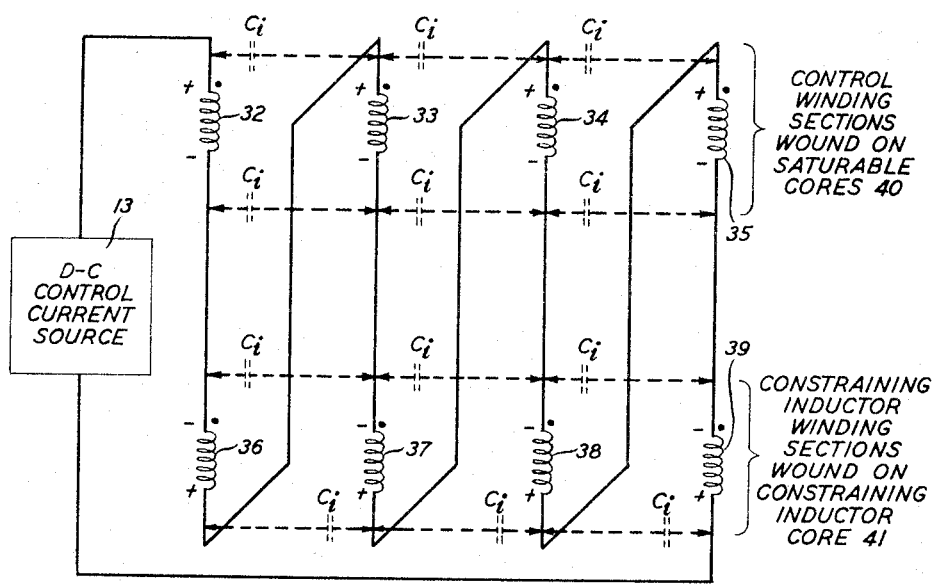
FIG. 3 shows the arrangement of the control winding-constraining inductor winding sections with respect to each other to illustrate the substantial elimination of the interwinding capacitance effects.

In order to provide for these improvements in performance the control winding of the saturable reactor of the present invention is divided into four separate winding sections 32 to 35, as illustrated in FIGS. 1 and 3, each winding section having an equal turns ratio of approximately 1:1.5 to the load windings 30 and 31. Because of the cumulative effects of the magnetic fields produced by each winding section an effective resultant turns ratio of 1:6 is created. An even greater number of separate winding sections could be used for even higher turns ratios. That is, in the operation of the saturable reactor/constraining inductor arrangement of the present invention a load current of a particular average amplitude requires a D.C. control current of only one-sixth the amplitude of the load current, while heretofore a control current of at least one-half of the load current amplitude had been required.

The constraining inductor is similarly divided into four separate winding sections 36 to 39 as illustrated in FIGS. 1 and 3. In the embodiment of the present invention individual sections of the control winding and individual sections of the constraining inductor are interconnected in an alternate fashion and by observing such polarity that the A.C. voltage which is induced in a particular control winding section is canceled by the voltage drop across the associated constraining inductor winding section. As a result, the net A.C. voltage across each pair of associated winding sections is zero.

FIG. 3 shows the specific interconnections of control winding sections 32 to 35 and constraining inductor winding sections 36 to 39 and, in addition, illustrates the effective elimination of the interwinding capacitance between the respective winding sections of the saturable reactor/constraining inductor arrangement of the present invention. The interwinding capacitance existing between various winding sections has been represented by several capacitors $C_i$. Winding pairs 32 and 36, 33 and 37, 34 and 38, and 35 and 39 particularly cooperate to eliminate the effects of the respective interwinding capacitance components. When in the operation of the present invention an A.C. load current component is inductively coupled, for instance, to control winding section 32, it will induce an A.C. voltage across winding section 32, where the induced voltage may have an instantaneous polarity as indicated in FIG. 3. The corresponding constraining inductor winding section 36 in opposing any voltage changes in the control circuit, in turn, develops, in response to the induced A.C. signal a voltage which is of a polarity opposite to that of the voltage induced in winding section 32. The instantaneous polarity of the voltage induced in winding section 36 is indicated in FIG. 3. Since these two instantaneous voltage components, i.e., the one component across section 32 and the other component across section 36, oppose each other and since they by design are of equal amplitude, they cancel each other. Consequently, the net A.C. voltage across winding sections 32 and 36 is zero. Similar A.C. voltage cancellations take place in the remaining winding section pairs, with the result that corresponding points of the respective control winding sections and constraining inductor winding sections have equal A.C. potentials with respect to each other as, for instance, the dot sides of the winding sections of the control winding and the dot sides of the constraining inductor winding sections. The interwinding capacitances represented by capacitors $C_1$ exist, therefore, between points of equal A.C. potential, thereby effectively eliminating the effects of the interwinding capacitances from the circuit.

In order to optimize the effective elimination of the interwinding capacitances between the respective winding sections of the embodiment of the invention, particularly illustrated in FIGS. 1 and 3, special winding techniques are employed. That is, winding sections 32 to 35 of the control winding and winding sections 36 to 39 of the constraining inductor are wound directly over each other on cores 40 and 41, respectively. Since the interwinding capacitance between the individual winding sections is distributed across all of the turns of the respective windings it is desirable not only to have an A.C. voltage cancellation with respect to the entire winding, but to have an effective zero A.C. potential between respective corresponding individual turns of the respective windings. In order to accomplish this optimization of the present invention the particular winding sections which are wound above each other have respective corresponding winding turns wound directly over each other. That is, the respective fifth turns, for instance, of winding sections 32 to 35 (or winding sections 36 to 39) are wound directly over each other so that the instantaneous A.C. potentials at each one of these turns are exactly equal, so that the A.C. potential between these turns is zero. The result is, that the interwinding capacitance between specific winding sections is not only canceled on an overall basis, but is effectively eliminated on a turn-to-turn basis, whereby the control current distortion is effectively eliminated.

It is to be understood that the above-described arrangement is illustrative of the application of the principles of the invention. Numerous other arrangements may be devised by those skilled in the art without departing from the spirit and scope of the invention.

I claim:

1. A saturable core reactor circuit having an output current waveform of substantially rectangular configuration when connected in circuit with a load device and a square-wave source of predetermined frequency comprising two saturable cores, a pair of load current windings on said saturable cores adapted to be connected in series with said source and said load, a control current source, a control winding on said saturable cores to control the magnetization of said cores, and a constraining inductor to suppress alternating currents in the control circuit, said control winding and said constraining inductor each comprising an equal number of winding sections each having two end terminals, each one of said control winding sections and constraining inductor winding sections having an equal number of winding turns, each one of said winding sections of said constraining inductor having one of its terminals connected to one terminal of one of said control winding sections to connect said control winding and constraining inductor winding sections in pairs of two sections each, and means serially connecting said pairs of constraining inductor winding sections and control winding sections across said control current source so that successive sections from said control winding and said constraining inductor follow one another in alternation, whereby the magnitude of the current from said control current source controls the magnitude of the current drawn by said load from said square-wave source.

2. A saturable core reactor circuit in accordance with claim 1 in which each of said winding sections of said control winding and said constraining inductor is wound on its respective core to have predetermined polarity characteristics with respect to the remaining winding sections on said respective core, and said pairs of respective corresponding consecutive winding sections are being interconnected so that the polarity of an A.C. voltage induced in a respective control winding section is opposite in polarity to the voltage developed across a respective corresponding constraining inductor section, whereby the A.C. voltage induced in a control winding section of a specific pair of winding sections is canceled by the voltage developed across the respective corresponding constraining inductor winding section to eliminate any A.C. components in the control circuit.

3. A saturable reactor circuit in accordance with claim 2 in which consecutive winding sections of said control winding and said constraining inductor are wound directly over each other on the saturable cores and constraining inductor core, respectively, and said winding sections on a common core are so wound that respective winding turns of consecutive winding sections are situated adjacent to each other on said respective core, whereby the instantaneous A.C. potential at corresponding turns of the repective winding sections is equal so that the A.C. potential between said respective turns of said winding sections is equal to zero.

4. A saturable core reactor circuit in accordance with claim 3 in which the magnitude of said current supplied from said control current source is at least several times smaller than the average magnitude of the current supplied from said square-wave source.

5. In combination an electrical circuit including a saturable core reactor connected in circuit with a load device and a square-wave source of predetermined frequency, said saturable core reactor comprising two saturable cores, a pair of load current windings on said saturable cores adapted to be connected in series with said source and said load, a control current source, a control winding on said saturable cores to control the magnetization of said cores, and a constraining inductor to suppress alternating currents in the control circuit, said control winding and said constraining inductor each comprising an equal number of winding sections each having two end terminals, each one of said control winding sections and constraining inductor winding sections having an equal number of winding turns, each one of said winding sections of said constraining inductor having one of its terminals connected to one terminal of one of said control winding sections, to connect said control winding and constraining inductor sections in pairs of two sections each, means serially connecting said pairs of constraining inductor winding sections and control winding sections across said control current source, whereby successive sections from said control source and said constraining inductor follow one another in alternation, said load device comprising a coupling transformer and a driven transistor inverter, said coupling transformer and said inverter being connected to couple said square-wave drive source to said inverter, and said inverter having at least two transistors conducting alternately and in phase opposition to one another in response to the drive signal from said square-wave source, whereby the magnitude of the current from said control current source controls the magnitude of the current drawn by said load from said square-wave source.

References Cited

UNITED STATES PATENTS

| 2,767,371 | 10/1956 | Beaubien | 323—89 |
| 2,809,303 | 10/1957 | Collins | 307—88 |
| 2,957,125 | 10/1960 | Lawrence | 330—8 XR |
| 2,968,739 | 1/1961 | Mohler | 331—113 XR |
| 2,990,509 | 6/1961 | Hauck | 323—89 |
| 2,998,564 | 8/1961 | Lawrence | 323—89 |
| 3,109,133 | 10/1963 | Mills | 331—113 XR |
| 3,260,963 | 7/1966 | Relation et al. | |
| 3,391,352 | 7/1968 | Evans. | |

JOHN F. COUCH, Primary Examiner.

WM. SHOOP, Assistant Examiner.

U.S. Cl. X.R.

307—270; 323—89; 331—113